United States Patent
Dumas et al.

(10) Patent No.: US 6,199,163 B1
(45) Date of Patent: Mar. 6, 2001

(54) HARD DISK PASSWORD LOCK

(75) Inventors: Patrick A. Dumas, Barrington; Mark Pulver, Elmhurst, both of IL (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/621,672

(22) Filed: Mar. 26, 1996

(51) Int. Cl.[7] .................................................. H04K 1/00
(52) U.S. Cl. ............................................. 713/183; 713/184
(58) Field of Search ....................... 380/44, 94; 713/183, 713/184

(56) References Cited

U.S. PATENT DOCUMENTS

| | | | |
|---|---|---|---|
| 4,937,861 | * | 6/1990 | Cummins .................................. 380/4 |
| 5,212,729 | * | 5/1993 | Schafer ..................................... 380/4 |
| 5,231,662 | * | 7/1993 | van Rumpt et al. ..................... 380/9 |
| 5,283,828 | * | 2/1994 | Saunders et al. ........................ 380/4 |
| 5,327,563 | * | 7/1994 | Singh ....................................... 380/4 |
| 5,343,525 | * | 8/1994 | Hung et al. .............................. 380/4 |
| 5,375,243 | * | 12/1994 | Parzych et al. .......................... 380/4 |
| 5,497,419 | * | 3/1996 | Hill ......................................... 380/9 |
| 5,513,262 | * | 4/1996 | van Rumpt et al. ..................... 380/4 |
| 5,615,262 | * | 3/1997 | Guy et al. ................................ 380/4 |
| 6,038,220 | * | 3/2000 | Miller ..................................... 380/44 |

* cited by examiner

Primary Examiner—Salvatore Cansialosi
(74) Attorney, Agent, or Firm—Katten Muchin Zavis

(57) ABSTRACT

The invention provides an encryption circuit for encrypting and decrypting data as it travels to and from a hard disk. The encryption circuit can be turned on or off under control of the BIOS program and a user supplied password. With the present invention, a removed hard disk cannot be read without the user supplied password and a similar encryption circuit.

8 Claims, 5 Drawing Sheets

HARD DISK PASSWORD LOCK

FIELD OF THE INVENTION

The invention relates to computer security devices. Specifically, this invention relates to a method of encrypting data on a removable hard disk.

BACKGROUND OF THE INVENTION

Early computer systems were protected by physical security. These computers were kept in locked rooms and often had around the clock security or were used around the clock because of their extreme cost. The first challenge to computer security came with remote terminals. The terminals were often distributed throughout a building or campus, and did not receive the same security as the computer.

To meet this challenge, computer operating systems were equipped with user accounts. Each user account was protected by a password. A user at a remote terminal could not access the computer without his assigned password. In these early systems, the password control formed part of the operating system. The computer itself had to remain secure or the user account and password security was useless.

With the advent of personal computers, operating system or application software security systems became unreliable. An unauthorized user could simply turn off the computer and restart it using software from an external source, such as a floppy disk. In response to this new threat to security, personal computers were equipped with BIOS (Basic Input Output System) based software passwords. A BIOS based password program runs before control of the computer is given to any disk based software. This prevents an unauthorized user from accessing data by starting the computer from a floppy disk or using other means to change the disk based software.

While the BIOS based security software is better than disk based security software, it still does not protect data removed from the computer. An unauthorized user can remove a hard disk or other mass storage device from a protected computer and read the data using another computer. Many computers now come with easily removable hard disks. This is particularly common in servers and portable computers. Removable hard disks make it easier than ever to bypass a computer's security by moving data to another computer.

SUMMARY OF THE INVENTION

The invention provides an encryption circuit for encrypting and decrypting data as it travels to and from a hard disk or other mass storage device. The encryption circuit can be turned on or off under control of the BIOS program and a user supplied password. With the present invention, a removed hard disk cannot be read without the user supplied password and a similar encryption circuit.

BRIEF DESCRIPTION OF THE DRAWINGS

Preferred embodiments demonstrating the various objectives and features of the invention will now be described in conjunction with the following drawings.

DETAILED DESCRIPTION OF THE PREFERRED EMBODIMENTS OF THE INVENTION

Figure 1:
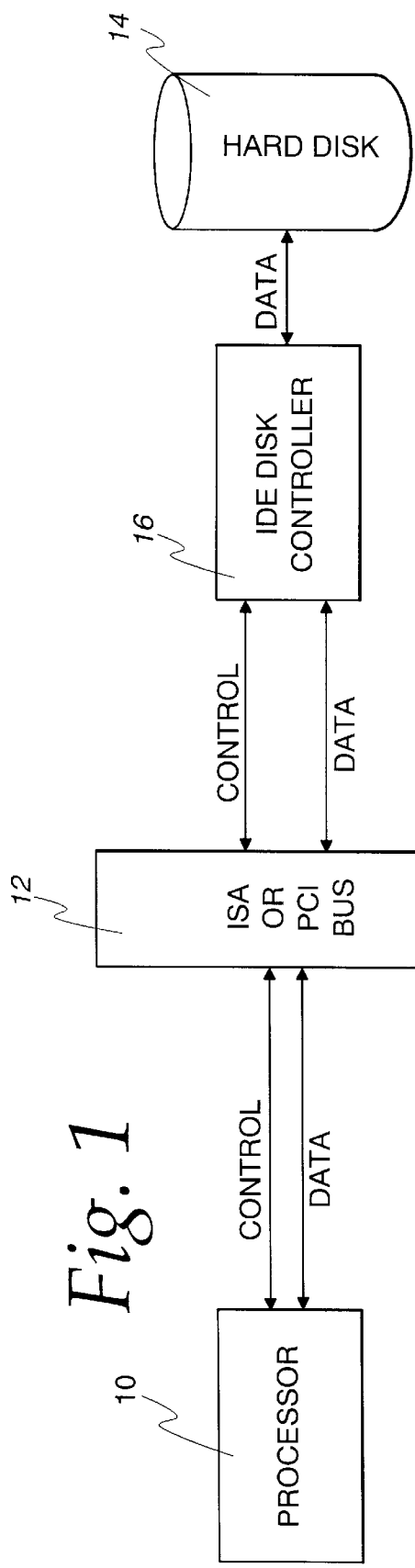
FIG. 1 is a block diagram of a typical prior art computer system.

Referring to FIG. 1, a computer system according to the prior art, consists of a processor 10, requesting data through a bus 12. Requests for data from a hard disk 14 are sent by the processor 10 over the bus 12 to a disk controller 16. The disk controller 16 retrieves the data from the hard disk 14 and returns the data over the bus 12 to the processor 10.

Figure 2:
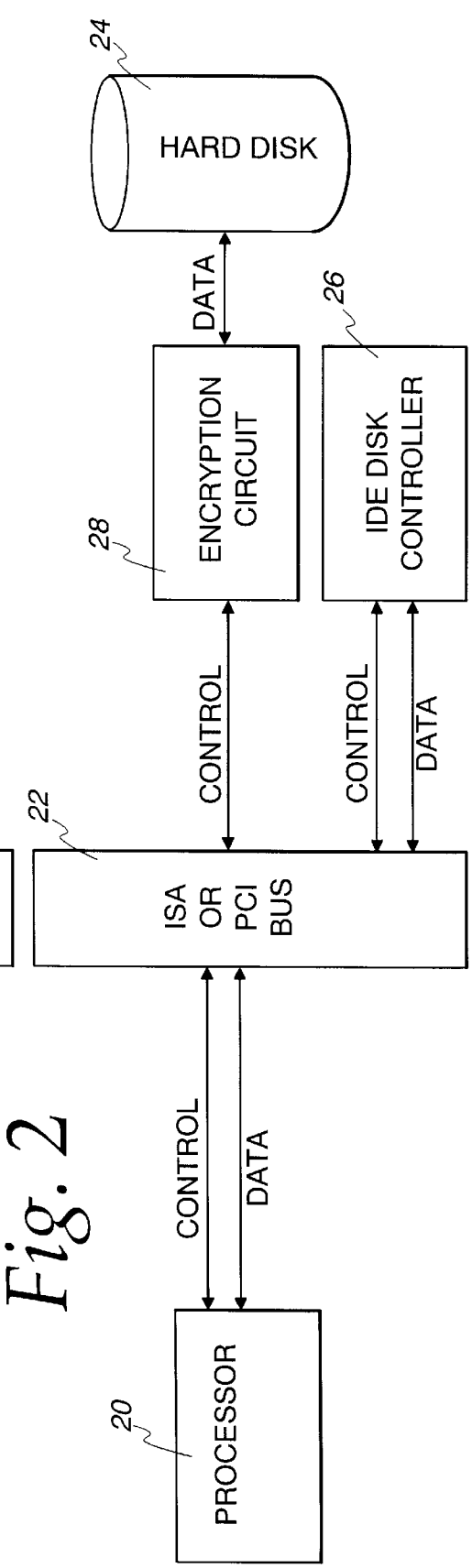
FIG. 2 is a block diagram of a computer system including the present invention.

FIG. 2 shows a block diagram of a computer system incorporating the present invention. A processor 20, requests data through a bus 22. Requests for data from a hard disk 24 are sent by the processor 20 over the bus 22 to a disk controller 26. The disk controller 26 retrieves the data from the hard disk 24 and returns the data over the bus 22 to the processor 20. The present invention adds an encryption circuit 28. Data must pass through encryption circuit 28 to travel from hard disk 24 to processor 20, or from processor 20 to hard disk 24. In the preferred embodiment of the invention, an encryption circuit 28, is implemented in an application specific integrated circuit (ASIC). An ASIC can encrypt or decrypt a word of data in a single clock cycle. This allows the encryption process to work within the normal data transfer time and hence be transparent to the rest of the computer system. Data is encrypted as it passes through encryption circuit 28, as it goes from processor 20 to hard disk 24. Data is decrypted as it passes through encryption circuit 28 as it goes from hard disk 24 to processor 20. The encryption algorithm is a function of a provided password.

Since the encryption algorithm is a function of the user's password, many users can have identical encryption circuit and not be able to read each other's data without the encrypting password. At the same time, encrypted data can easily be moved to another machine with the same encryption circuit and the same password. As long as the user protects his password, the data is secure even though the encryption algorithm may be well known.

The password is stored in two locations. It is stored in a write only register on the encryption ASIC. The password register is non-volatile memory, and is lost each time the computer is turned off. The password is also stored at the end of the boot block on the hard disk. Since the data on the hard disk survives power loss, the password is encrypted by itself. Hence, an intruder who is able to access the password cannot read the password unless he already has the password. The encryption circuit simply replicates the encryption algorithm in hardware to execute it quickly.

It is possible, if desired by the user, to store the password both on the drive and in the computer system. As long as the two passwords match the hard disk can be used without having to input a password. If the hard disk is removed from the computer system and placed in another computer system, the password must be entered in the new computer system before a user can access the data on the hard disk.

Therefore, encryption circuit 28 can be identical in multiple computers. An encrypted hard disk can only be read on another computer if the computer operator has the password used to encrypt the disk.

As with the BIOS based system password, the software that controls the encryption circuit 28 must run as part of the BIOS before control of the computer is given any disk based software.

Figure 3:
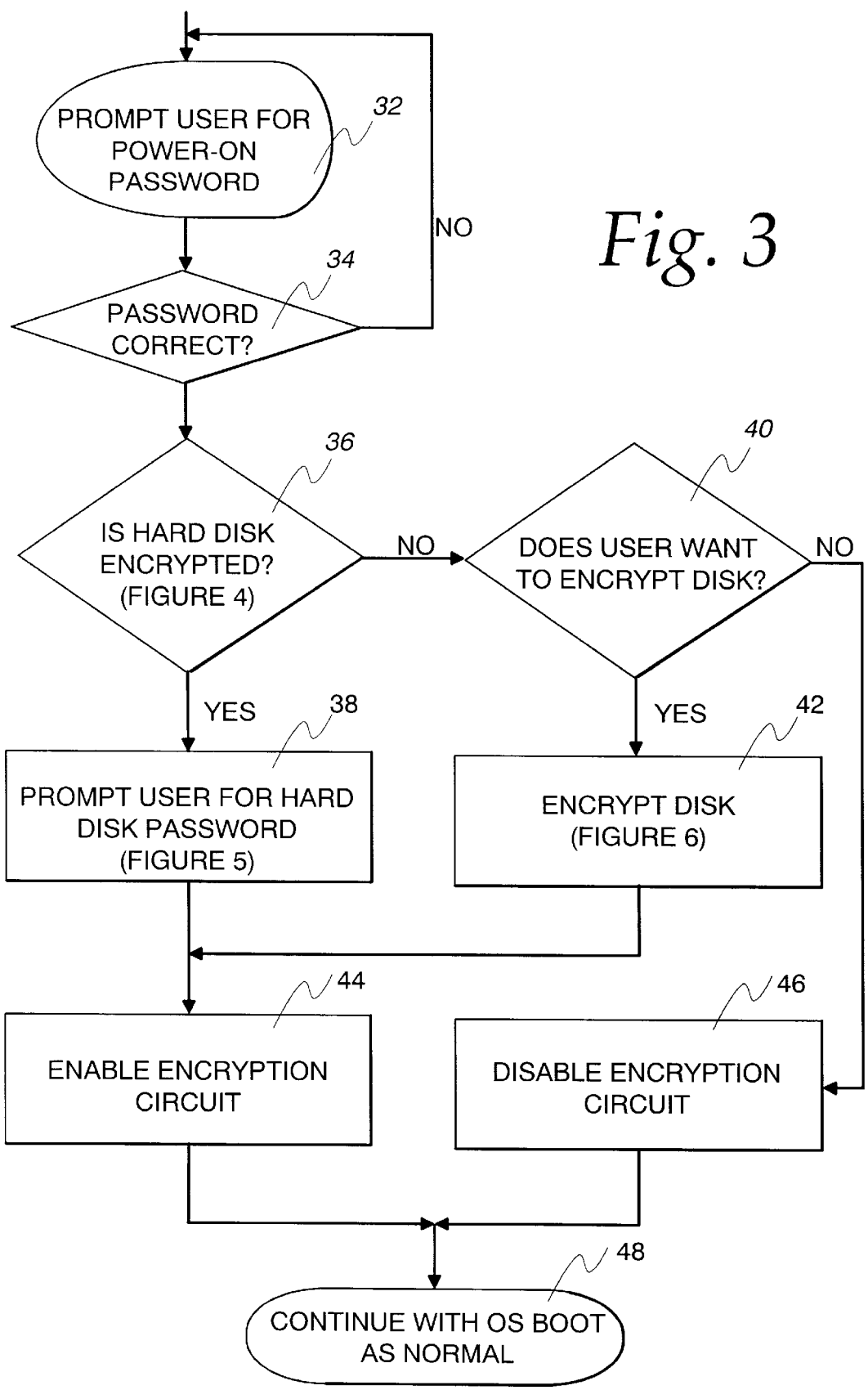
FIG. 3 is a flow chart showing control of the encryption circuit.

Referring to FIG. 3, the drive security program begins with a power-on password such as exists in many prior art systems. The system prompts the user for a password 32 and then tests to see if the user supplied password matches a password stored on the hard disk. If the passwords do not match, the user again receives a prompt for the user password 32. This loop will continue until the correct password is supplied. The BIOS will not start the computer without the correct password. If the user supplied password matches the password stored on the hard disk, then the software tests to determine if the hard drive is encrypted 36. Step 36 is described in more detail in FIG. 4. If the hard disk 24 is encrypted, the software prompts the user for hard disk password 38. Step 38 is shown in more detail in FIG. 5.

If the hard drive is not encrypted, the software asks if the user wants to encrypt the hard drive 40. If the user responds yes, the drive is encrypted 42. Step 42 is shown in greater detail in FIG. 6. Then, the encryption circuit 28 is enabled 44. If the user responds "no" to the question in step 40, the encryption circuit 28 is disabled 46. Then, the normal BIOS boot up procedure continues 48.

Figures 4, 5:
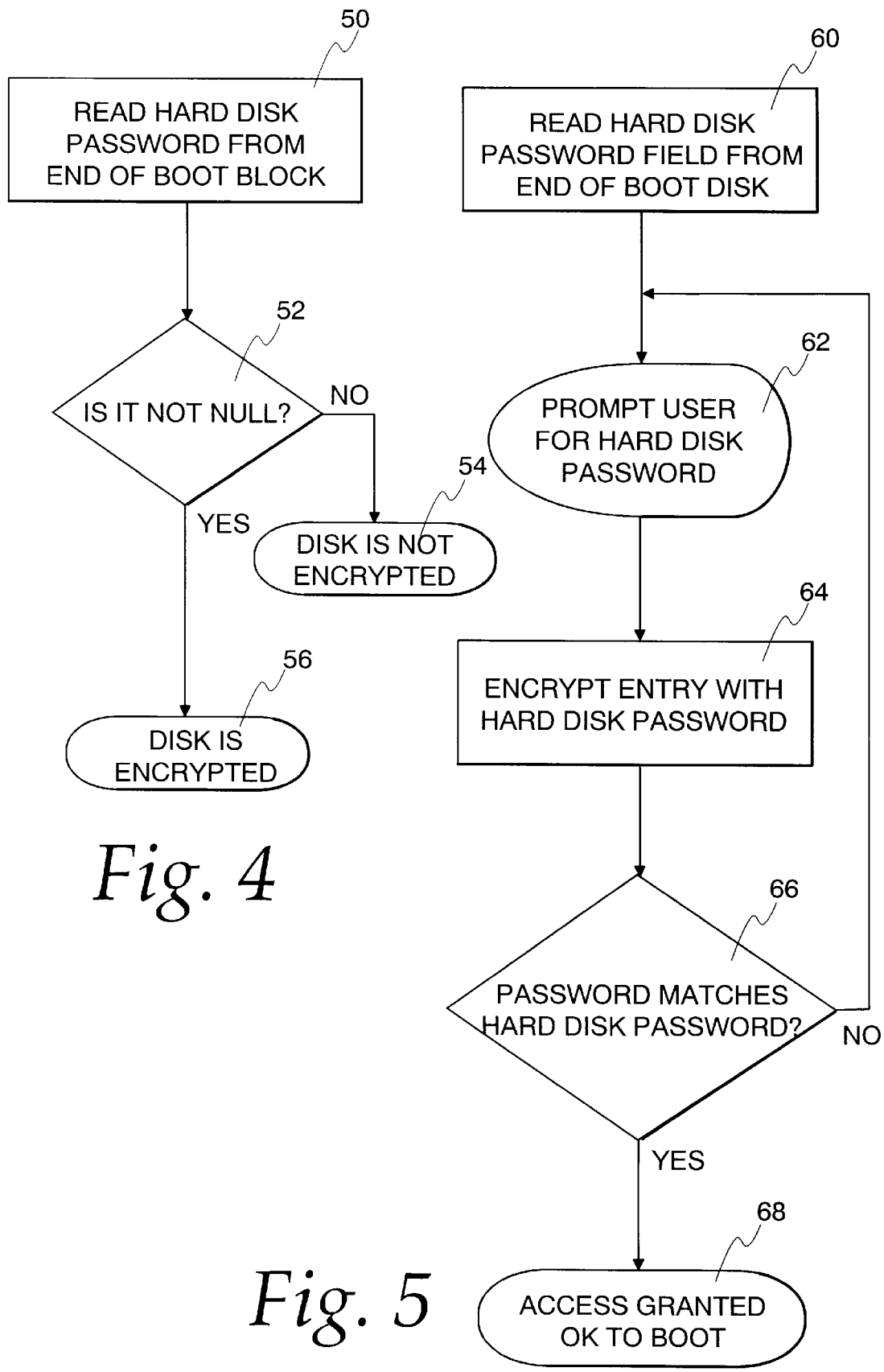
FIG. 4 is a flow chart showing the test for an encrypted hard disk.
FIG. 5 is a flow chart showing the test for the user supplied password.

FIG. 4 expands on step 36 in FIG. 3. The system determines if the drive is encrypted by reading the hard disk password 50 and comparing it with null 52. If the password is null, the drive is not encrypted 54. If the password is not null, the drive is encrypted. 56.

FIG. 5 expands on step 38 in FIG. 3. The hard disk password verification routine begins by reading the encrypted hard disk password 60. The system prompts the user for the hard disk password 62, loads the user provided password into the encryption circuit 28, and then encrypts the user's entry using itself 64. The system compares the two passwords 66. If there is a match the boot process continues 68. If not, the system again prompts the user for the hard disk password 62.

Figures 6, 7:
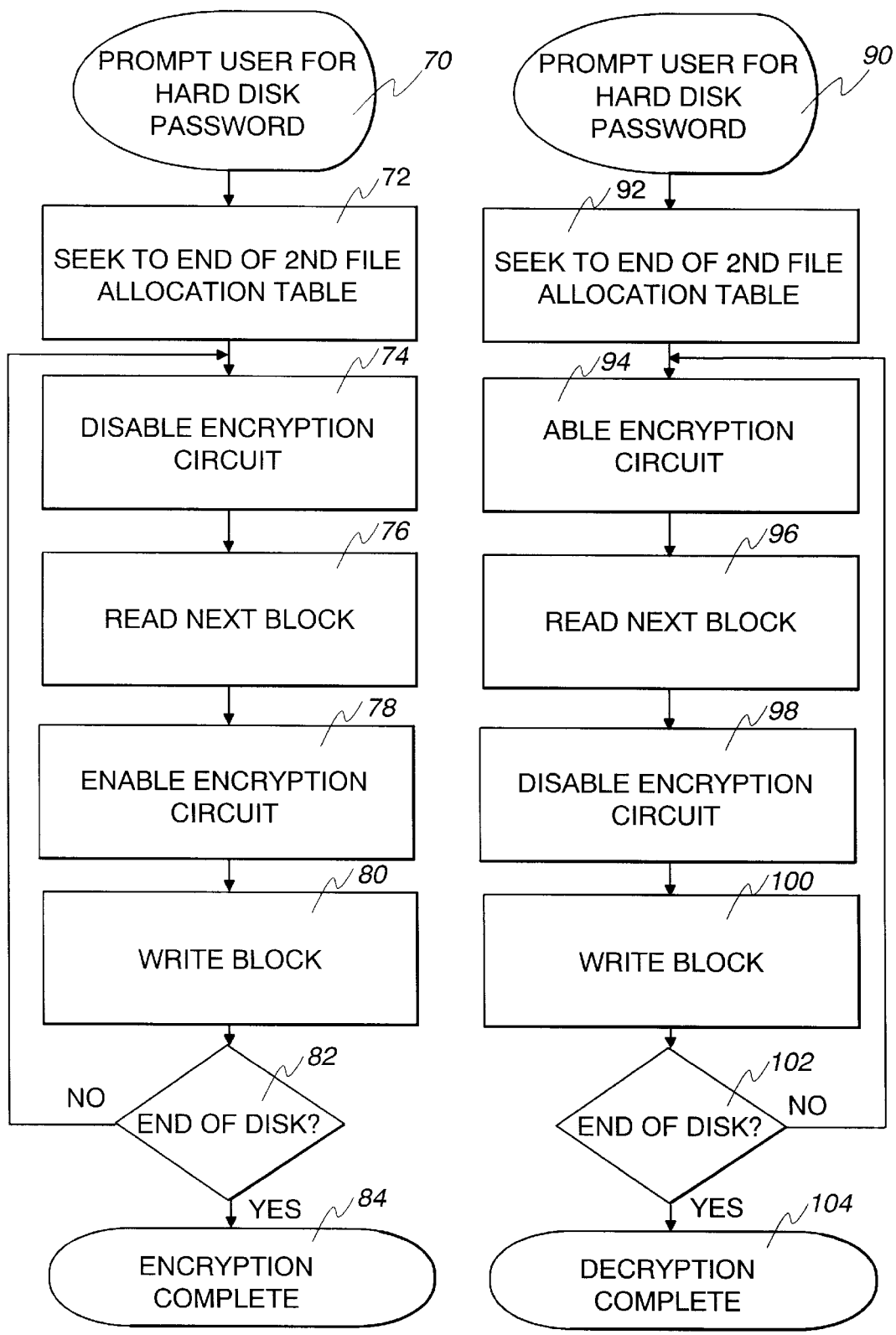
FIG. 6 is a flow chart showing the method for encrypting an unencrypted disk.
FIG. 7 is a flow chart showing the method for unencrypting an encrypted disk.

FIG. 6 expands on step 42 in FIG. 3. The hard disk encryption routine begins by prompting the user for a new hard disk password 70. Then, the drive seeks the end of the second file allocation table (FAT) 72. The file allocation tables are not encrypted. The following loop is repeated: the encryption circuit is disabled 74; a block is read from the hard disk 76; the encryption circuit is enabled 78; the same block is written back to the hard disk 80. After each repetition, the system tests for the end of the hard disk 82. If it is not the end of the hard disk, the process 74–80 is repeated. The encryption is complete 84 after encryption of the last block on the drive.

FIG. 7 describes the opposite function, the decryption of an encrypted disk. The hard disk decryption routine begins by prompting the user for the current hard disk password 90. Then, the drive seeks the end of the second file allocation table (FAT) 92. The following loop is repeated: the encryption circuit is enabled 94; a block is read from the hard disk 96; the encryption circuit is disabled 98; the same block is written back to the hard disk 100. After each repetition the system tests for the end of the hard disk 102. If it is not the end of the hard disk, the process 94–80 is repeated. The encryption is complete 104 after encryption of the last block on the drive.

Figure 8:
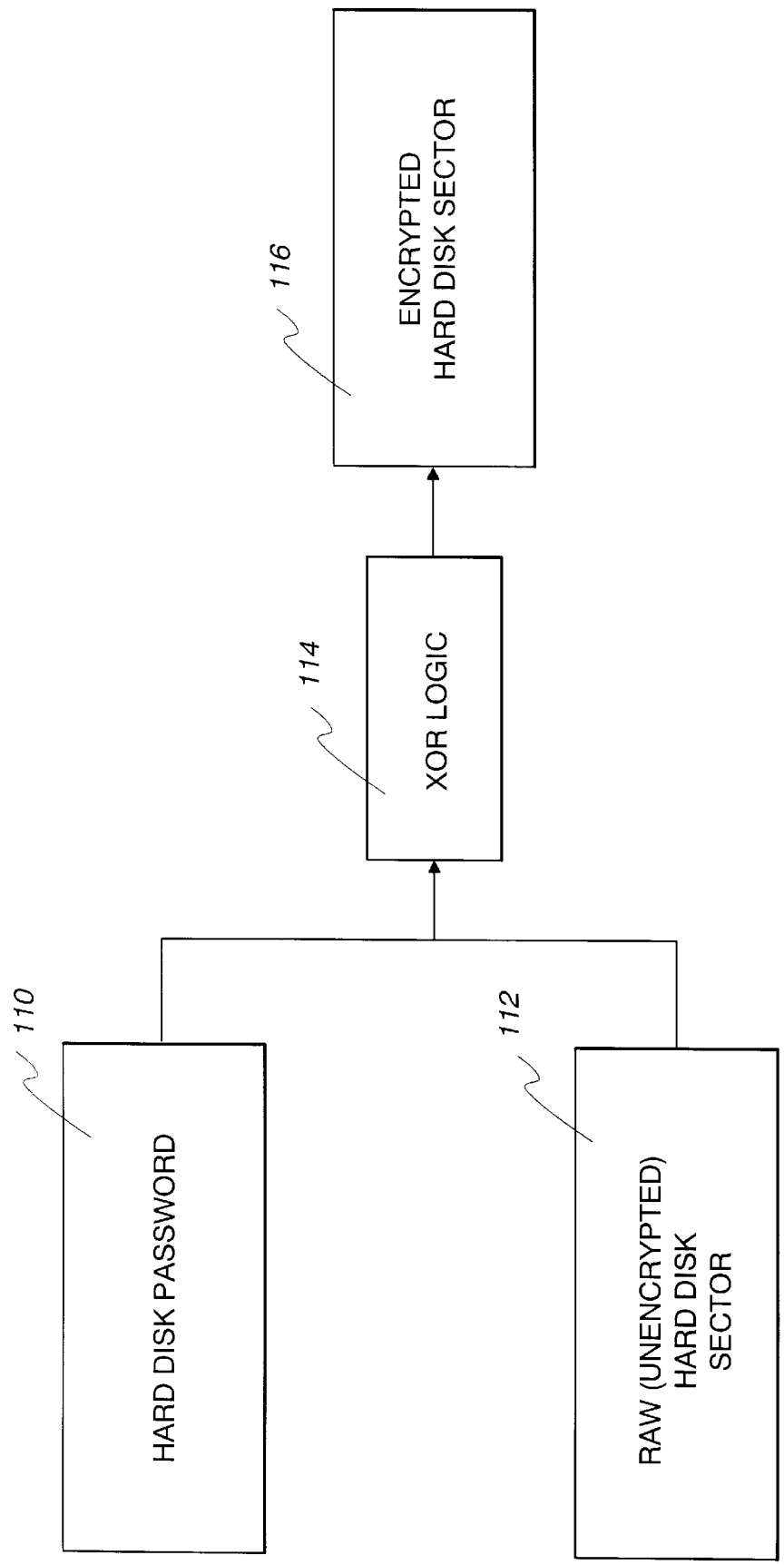
FIG. 8 is a block diagram of the encryption circuit.

Referring to FIG. 8, the encryption circuit 28 includes a password storage register 110. Password storage register 110 is both write only and volatile. The register cannot be read and loses its contents when power is lost. The encryption circuit 28 also includes a memory for storing one unencrypted sector 112. The password and unencrypted sector are combined in exclusive or (XOR) logic 114 and output to a memory for storing one encrypted sector 116.

The password can be combined with the data to be encrypted in many different ways depending on how much complexity is desired. The simplest method is to combine the first byte of the password with the first byte of the data with an XOR. Then, combine the second byte of the data with the second byte of the password with the XOR. When the last byte of the password is used, the first byte is used again to XOR with the data. This is continued to the end of the sector. A new sector always begins at the beginning of the password.

Although described above in terms of the preferred embodiment, the present invention is set forth with particularity in the appended claims. Such modifications and alterations as would be apparent to one of ordinary skill in the art and familiar with the teachings of this application shall be deemed to fall within the spirit and scope of the invention.

In particular, the preferred embodiment of the invention describes a hard disk. In the near future, it is probable that computer mass data storage will not be in the form of a magnetic hard disk but in some form of non-volatile silicon. The invention is independent of the technology used to store data and any mass-storage device is deemed to be within the spirit of the invention.

What is claimed is:

1. A computer system comprising:
   a CPU;
   a mass storage device;
   a bus for coupling the CPU and the mass storage device;
   a encryption circuit intercepting data traveling between said CPU and said mass storage device, for encrypting and decrypting data as it travels to and from said mass storage device and said CPU.

2. The computer system according to claim 1 further comprising means for storing a password.

3. The computer system according to claim 2 wherein said encryption circuit includes means for encrypting and decrypting data according to said password.

4. The computer system according to claim 1 further comprising means for removing said mass storage device.

5. The computer system according to claim 1 further comprising means for removing said mass storage device and said means for storing a password as a single unit.

6. A mass storage device for installation in a computer comprising:
   mass storage media for storing data;
   means for storing a password;
   mounting means for mounting said mass storage device in a computer; and
   an encryption circuit for encrypting data using said password as a key.

7. A method for encrypting and decrypting data comprising:
   providing a computer system including a CPU and a mass storage device connected by a bus;
   requesting a password from a user;
   encrypting data, using said password as a key, as it travels from said CPU to said mass storage device; and decrypting data using said password as a key, as it travels from said mass storage device to said CPU.

8. The method according to claim 7 further comprising storing said password and only requesting said password on a first use and retrieving said password from storage on subsequent uses.

* * * * *

UNITED STATES PATENT AND TRADEMARK OFFICE
CERTIFICATE OF CORRECTION

PATENT NO. : 6,199,163 B1
DATED : March 6, 2001
INVENTOR(S) : Dumas et al.

It is certified that error appears in the above-identified patent and that said Letters Patent is hereby corrected as shown below:

Claims, 1. (Amended) A computer system comprising:
a CPU;
a mass storage device;
a bus for coupling the CPU and the mass storage device;
a encryption circuit <u>employing a predetermined encryption algorithm;</u>
<u>a password storage register operable with said encryption circuit for</u> intercepting data traveling between said CPU and said mass storage device, for encrypting and decrypting data as it travels to and from said mass storage device and said CPU<u>; and</u>
    <u>system software for retreiving a password from said mass storage device for comparision with said password storage register.</u>

2. (Amended) The computer system according to claim 1 [further comprising means for] <u>wherein said password storage register comprises a write only register for</u> storing a password.

3. (Amended) The computer system according to claim 2 wherein said encryption circuit [includes means] <u>provides</u> for encrypting and decrypting data <u>including the password from said mass storage device</u> according to said password.

4. (Amended) The computer system according to claim 1 [further comprising means for removing] <u>wherein</u> said mass storage device <u>is removable</u>.

5. (Amended) The computer system according to claim 1 [further comprising means for removing said mass storage device and said means for storing a password as a single unit] <u>wherein said system software comprises a basic input output system (BIOS) for retreiving the password from said mass storage device facilitating the removal of said mass storage device for use in personal computers employing said predetermined encryption algorithm.</u>

UNITED STATES PATENT AND TRADEMARK OFFICE
CERTIFICATE OF CORRECTION

PATENT NO.   : 6,199,163 B1
DATED        : March 6, 2001
INVENTOR(S)  : Dumas et al.

It is certified that error appears in the above-identified patent and that said Letters Patent is hereby corrected as shown below:

6. (Amended) A mass storage device for installation in a computer comprising:
        mass storage media for storing data;
        [means for storing a password;]
        [mounting means] a bus connection for mounting said mass storage device in a computer; [and]
        an encryption circuit employing a predetermined encryption algorithm;
        a password storage register operable with said encryption circuit for for encrypting data using [said] a password as a key; and
system software for retreiving the password from said mass storage
media for comparison with said password storage register.

7. (Amended) A method for encrypting and decrypting data comprising:
        providing a computer system including a CPU and a mass storage device connected by a bus;
        requesting a password from a user;
        encrypting data employing a predetermined encryption algorithm and a stored password operable with an encryption circuit, using said password as a key, as it travels from said CPU to said mass storage device; and
        decrypting data using said password as a key, as it travels from said mass storage device to said CPU; and
        retrieving a password from the mass storage device for comparison with the stored password.

UNITED STATES PATENT AND TRADEMARK OFFICE
CERTIFICATE OF CORRECTION

PATENT NO. : 6,199,163 B1
DATED : March 6, 2001
INVENTOR(S) : Dumas et al.

It is certified that error appears in the above-identified patent and that said Letters Patent is hereby corrected as shown below:

8. (Amended) The method according to claim 7 further comprising storing said password <u>in a write only register</u> and only requesting said password <u>from a user</u> on a first use and retrieving said password from [storage] <u>the mass storage device</u> on subsequent uses.

Signed and Sealed this

Twentieth Day of November, 2001

Attest:

NICHOLAS P. GODICI
*Attesting Officer*     *Acting Director of the United States Patent and Trademark Office*